United States Patent
Keen

(10) Patent No.: US 10,156,255 B2
(45) Date of Patent: Dec. 18, 2018

(54) MECHANICAL LINK WITH SINGLE COIL FLEXIBLE MEMBER ACCOMMODATING MULTIPLE-AXIS ROTATION

(71) Applicant: ULTRA ELECTRONICS LIMITED, Middlesex (GB)

(72) Inventor: Phil Keen, Middlesex (GB)

(73) Assignee: ULTRA ELECTRONICS LIMITED, Middlesex (GB)

( * ) Notice: Subject to any disclaimer, the term of this patent is extended or adjusted under 35 U.S.C. 154(b) by 0 days.

(21) Appl. No.: 15/598,109

(22) Filed: May 17, 2017

(65) Prior Publication Data

US 2017/0343039 A1 Nov. 30, 2017

(30) Foreign Application Priority Data

May 27, 2016 (GB) .................................. 1609381.7

(51) Int. Cl.
*F16C 11/12* (2006.01)
*F16D 3/38* (2006.01)
(Continued)

(52) U.S. Cl.
CPC ............ *F16C 11/12* (2013.01); *B60R 16/027* (2013.01); *B60R 16/03* (2013.01); *B60R 16/08* (2013.01);
(Continued)

(58) Field of Classification Search
CPC ........ H01R 39/643; F16C 11/12; F16C 3/015; F16C 11/06; B60R 16/027; B60R 16/03; B60R 16/08; E05D 11/0081
(Continued)

(56) References Cited

U.S. PATENT DOCUMENTS

| 4,382,624 A | * | 5/1983 | Lysenko | ................. B66C 3/005 294/119.4 |
| 4,685,349 A | * | 8/1987 | Wada | ......................... B25J 9/06 414/680 |

(Continued)

FOREIGN PATENT DOCUMENTS

| CN | 2049419 A | 12/1989 |
| CN | 102147516 A | 8/2011 |

(Continued)

OTHER PUBLICATIONS

UKIPO Search Report dated Oct. 27, 2016 for application No. GB1609381.7.
(Continued)

*Primary Examiner* — Harshad C Patel
(74) *Attorney, Agent, or Firm* — One LLP; Jonathan Jaech

(57) ABSTRACT

A mechanical link (100, FIG. 5), the mechanical link comprising a first arm (120), a second arm (140) and an interconnection member (160), wherein: the first arm is rotatable about a first axis of the interconnection member; the second arm is rotatable about a second axis of the interconnection member, the second axis being orthogonal to the first axis; and wherein: a flexible member (400) extends along the first and second arms and is adapted to accommodate rotation of the arms about the first and second axes, the flexible member having a single coiled portion (440) which is received within the interconnection member such that the coiled portion can coil and uncoil to accommodate rotation of the first arm, wherein the coiled portion is further configured to twist about an axis of the flexible member to accommodate rotation of the second arm.

18 Claims, 5 Drawing Sheets

(51) Int. Cl.
*B60R 16/027* (2006.01)
*B60R 16/03* (2006.01)
*B60R 16/08* (2006.01)
*E05D 11/00* (2006.01)
*F16C 11/06* (2006.01)
*F16L 3/015* (2006.01)
*H01R 39/64* (2006.01)
*F01C 1/063* (2006.01)
*F16D 3/28* (2006.01)
*F16D 3/32* (2006.01)
*F16F 1/04* (2006.01)

(52) U.S. Cl.
CPC .......... *E05D 11/0081* (2013.01); *F01C 1/063* (2013.01); *F16C 11/06* (2013.01); *F16D 3/28* (2013.01); *F16D 3/32* (2013.01); *F16D 3/38* (2013.01); *F16D 3/387* (2013.01); *F16F 1/04* (2013.01); *F16L 3/015* (2013.01); *H01R 39/643* (2013.01)

(58) Field of Classification Search
USPC .......................................... 439/17
See application file for complete search history.

(56) References Cited

U.S. PATENT DOCUMENTS

| | | | |
|---|---|---|---|
| 5,381,486 A | 1/1995 | Ludeke et al. | |
| 5,735,707 A | 4/1998 | O'Groske et al. | |
| 5,995,373 A * | 11/1999 | Nagai | G06F 1/1616 16/223 |
| 6,616,467 B2 * | 9/2003 | Ibaraki | H01R 35/02 379/433.13 |
| 7,466,558 B2 * | 12/2008 | Yasuda | H04M 1/0216 361/752 |
| 8,157,569 B1 * | 4/2012 | Liu | H01R 35/04 439/11 |
| 2002/0129945 A1 | 9/2002 | Brewer | |
| 2004/0106458 A1 * | 6/2004 | Thompson | F16D 3/30 464/112 |
| 2010/0038495 A1 * | 2/2010 | Jinushi | B25J 19/0025 248/68.1 |
| 2013/0165242 A1 | 6/2013 | Liu | |
| 2014/0049895 A1 * | 2/2014 | Lee | H05K 5/0017 361/679.28 |
| 2014/0206460 A1 | 7/2014 | Dupielet et al. | |

FOREIGN PATENT DOCUMENTS

| | | |
|---|---|---|
| CN | 202067009 U | 12/2011 |
| CN | 102330752 A | 1/2012 |
| CN | 202301512 U | 7/2012 |
| CN | 202851711 U | 4/2013 |
| CN | 103591160 A | 2/2014 |
| CN | 204164978 U | 2/2015 |
| CN | 104993431 A | 10/2015 |
| CN | 204793903 U | 11/2015 |
| DE | 202004020194 U | 3/2005 |
| EP | 1889808 A | 2/2008 |
| GB | 616486 A | 1/1949 |
| GB | 827256 A | 2/1960 |
| JP | H11270574 A | 10/1999 |
| JP | 2003212113 A | 7/2003 |
| JP | 2004112978 A | 4/2004 |
| JP | 2009216220 A | 9/2009 |
| JP | 2014092193 A | 5/2014 |

OTHER PUBLICATIONS

Pre-filing search results listing relevant documents to priority—founding GB1609381.7.
Machine translation for DE202004020194U1.
Machine translation for JP2004112978A.

* cited by examiner

MECHANICAL LINK WITH SINGLE COIL FLEXIBLE MEMBER ACCOMMODATING MULTIPLE-AXIS ROTATION

CROSS-REFERENCE TO RELATED APPLICATION

This application claims priority pursuant to 35 U.S.C. § 119(b) to Great Britain application Serial No. GB1609381.7 filed May 27, 2016, which is hereby incorporated by reference, in its entirety.

TECHNICAL FIELD

The present application relates to a mechanical link for guiding and protecting a flexible member such as a conductor, cable, hose or the like.

BACKGROUND TO THE INVENTION

There are numerous applications in which it is necessary to guide a flexible member such as an electrical conductor or cable, hydraulic hose or the like between two structures, where one structure is moveable relative to the other. For example, in the aerospace industry it is a common requirement for an electrical cable to provide power to components on moveable control surfaces, whilst in the automotive industry electrical conductors are commonly required to provide power to components in doors, wing mirrors and the like. In all of these applications the conductor must be able to withstand repeated movement of the structure to which it is connected without damage, whilst at the same time minimizing the amount of conductor used, to minimize weight and cost.

Solutions have been developed which house conductors within moveable joints, thereby accommodating the required range of movement whilst also protecting the conductor from damage from objects outside the joint. However, these solutions typically only accommodate movement about one axis at a time. Thus, where simultaneous movement about multiple axes is required, multiple separate joints are required, which increases complexity, cost and weight, whilst also reducing design flexibility.

Accordingly, a need exists for some means of guiding and protecting flexible members such as conductors that must accommodate movement between two structures about multiple axes simultaneously.

SUMMARY OF INVENTION

According to a first aspect of the present invention there is provided a mechanical link, the mechanical link comprising a first arm, a second arm and an interconnection member, wherein: the first arm is rotatable about a first axis of the interconnection member; the second arm is rotatable about a second axis of the interconnection member, the second axis being orthogonal to the first axis; and wherein: the flexible member extends along the first and second arms and is adapted to accommodate rotation of the arms about the first and second axes, the flexible member having a single coiled portion which is received within the interconnection member such that the coiled portion can coil and uncoil to accommodate rotation of the first arm, wherein the coiled portion is further configured to twist about an axis of the flexible member to accommodate rotation of the second arm.

The mechanical link of the present invention is capable of guiding and protecting a flexible member such as a conductor, hose or the like as the arms rotate about mutually orthogonal first and second axes simultaneously. Thus, the mechanical link permits complex three dimensional movement of interconnected structures, whilst protecting and guiding the flexible member. The coiled portion of the flexible member permits the flexible member to coil and uncoil in order to accommodate rotation about the first axis, and to twist in order to accommodate rotation about the second axis. Thus, the mechanical link provides a robust and cost effective solution to the problem of guiding a flexible member between structures that are required to perform complex three dimensional movements relative to each other.

The first arm may engage with a through pin that extends through the interconnection member along the first axis of the interconnection member to permit rotation of the first arm about the first axis.

The second arm may engage with first and second posts that are received in the interconnection member along the second axis of the interconnection member to permit rotation of the second arm about the second axis.

The through pin may be provided with a slot for receiving a portion of the flexible member.

The slot may extend through a full diameter of the through pin.

The through pin may comprise a solid end portion, and the slot may begin partway along the through pin from the solid end portion.

The through pin may further comprise a further slot for receiving a further portion of the flexible member.

The through pin may be provided with a channel for receiving the flexible member and guiding the flexible member towards the first arm.

The channel may be angled.

The first post may be provided with a channel for receiving the flexible member and guiding the flexible member towards the second arm.

The channel may be angled.

The first and second arms may each comprise a channel for receiving the flexible member.

The channel of the first arm may be aligned with the channel of the through pin.

The channel of the second arm may be aligned with the channel of the first post.

The mechanical link may be configured as a universal joint.

The flexible member may be a generally flat, elongate flexible electrical conductor.

The flexible electrical conductor may be a single continuous conductor.

Alternatively, the flexible member may comprise a cable or hose.

The first and second arms and the interconnection member may be of metal.

BRIEF DESCRIPTION OF THE DRAWINGS

Embodiments of the invention will now be described, strictly by way of example only, with reference to the accompanying drawings, of which.

DESCRIPTION OF THE EMBODIMENTS

Figure 1:
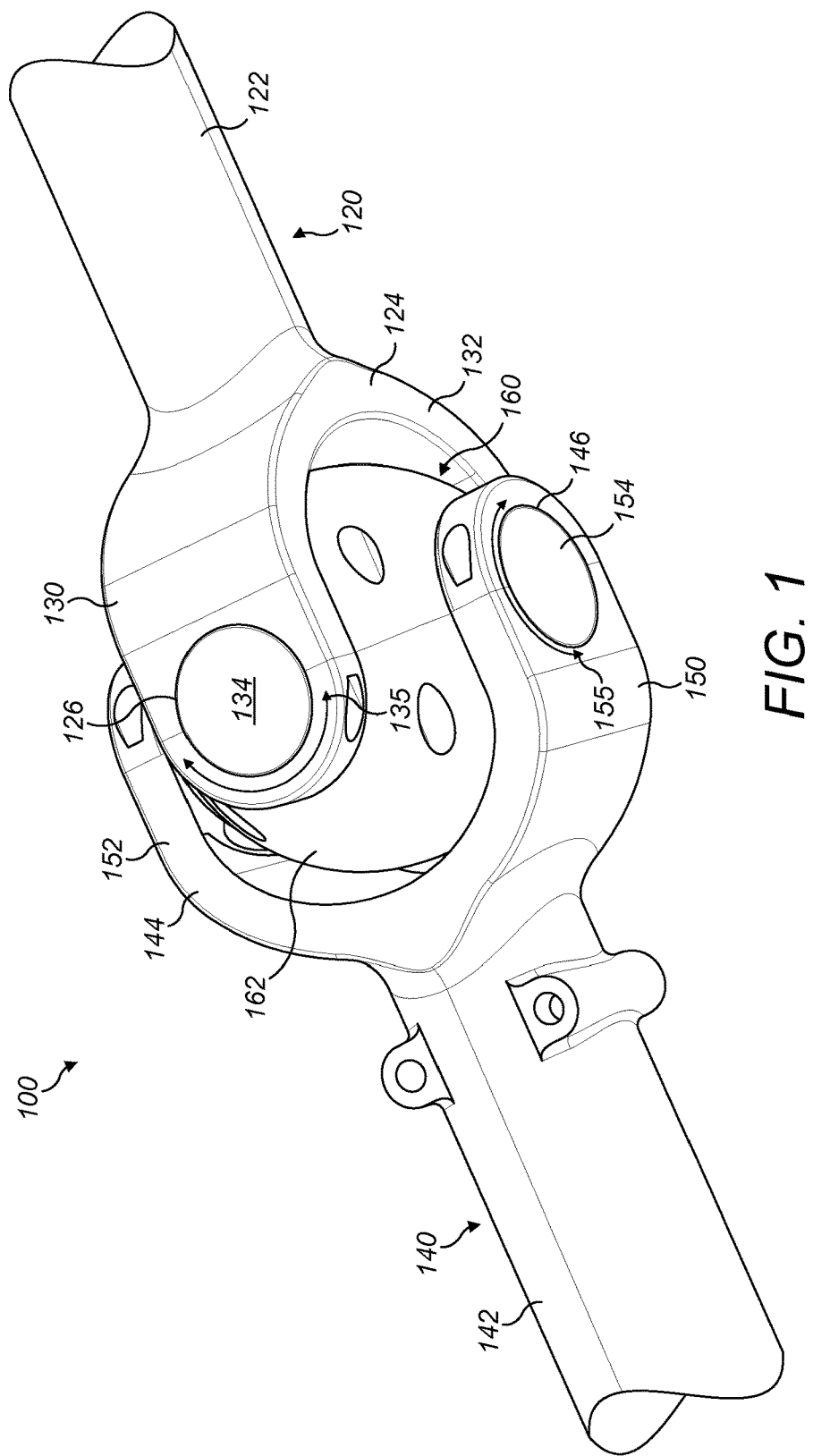
FIG. 1 is a schematic perspective representation of a mechanical link having first and second arms and an interconnection member which connects the first arm to the second arm.

Referring first to FIG. 1, a mechanical link is shown generally at 100. In the example described below and illustrated in the accompanying Figures the mechanical link 100 guides and protects a flexible conductor, but it will be appreciated by those skilled in the art that the principles described herein can be applied to other types of flexible members, including, for example, cables, pneumatic and hydraulic hoses, fiber optic cables and the like.

The mechanical link 100 is configured as a universal joint, and comprises a first arm 120, a second arm 140 and an interconnection member 160. The first arm 120 takes the form of a generally hollow shaft 122 which terminates in a first open yoke 124. The second arm 140 takes the form of a generally hollow shaft 142 which terminates in a second open yoke 144. The interconnection member 160 is received between the first and second yokes 124, 144 so as to link the first arm 120 to the second arm 140.

Generally circular apertures 126, 128 (aperture 128 not visible in FIG. 1) are provided in opposed first and second sides 130, 132 of the yoke 124 of the first arm 120. A through pin 134 is received in the apertures 126, 128, and extends between the first side 130 of the yoke 124 and the second side 132 of yoke 124. The through pin 134, in the illustrated example, is fixedly received in the apertures 126, 128, such that the first arm 120 moves with the through pin 134. When the link 100 is assembled, the through pin 134 is rotatably received within the interconnection member 160, such that the interconnection member 160 is able to rotate about the through pin 134, in the directions indicated by the arrow 135. Alternatively, the through pin 134 may be rotatably received in the apertures 126, 128 and fixedly received within the interconnection member 160, such that the first arm 120 is able to rotate about the through pin 134 in the directions indicated by the arrow 135.

Generally circular apertures 146, 148 (aperture 148 not visible in FIG. 1) are also provided in opposed first and second sides 150, 152 of the yoke 144 of the second arm 140. A first post 154 is fixedly received in the aperture 146, and a second post 156 (not visible in FIG. 1) is fixedly received in the aperture 148, coaxially with the first post 154. In this way, the second arm 140 moves with the first and second posts 154, 156. When the link 100 is assembled, the first and second posts 154, 156 are rotatably received within the interconnection member 160, such that the first and second posts 154, 156 are able to rotate within the interconnection member 160, in the directions indicated by the arrow 155. Alternatively, the first and second posts 154, 156 may be rotatably received in the apertures 146, 148 and fixedly received within the interconnection member 160, such that the second arm 140 is able to rotate about the first and second posts 154, 156 in the directions indicated by the arrow 155.

The interconnection member 160 comprises a generally hollow housing 162 having a first generally circular aperture 164 (shown in FIG. 5) provided in a central portion of a first side of the housing 162, and a second generally circular aperture 166 (again, shown in FIG. 5) provided in a central portion of a second side of the housing 162, which second side is opposed to the first side. The first and second apertures 166, 168 are aligned with each other such that when the link 100 is assembled, with the through pin 134 received in the first and second apertures 164, 166, a longitudinal axis of the through pin 134 passes through a center of the interconnection member 160.

The interconnection member 160 is further provided with a third generally circular aperture 168 (again, shown in FIG. 5) provided in a central portion of a third side of the housing 162, and a fourth generally circular aperture 170 (again, shown in FIG. 5) provided in a central portion of a fourth side of the housing 162, which fourth side is opposed to the third side. The first and second sides of the housing 162 are substantially orthogonal to the third and fourth sides of the housing 162. The third and fourth apertures 168, 170 are aligned with one another, such that when the link 100 is assembled, with the first and second posts 154, 156 received in the third and fourth apertures 168, 170 respectively, a longitudinal axis of the (coaxially arranged) first and second posts 154, 156 passes through the center of the interconnection member 162, orthogonally to the longitudinal axis of the through pin 134. Thus, as can be seen from FIG. 1, when the link 100 is assembled the first and second arms 120, 140 are rotatable about mutually orthogonal axes in the directions indicated by arrows 135, 155.

Figure 2:
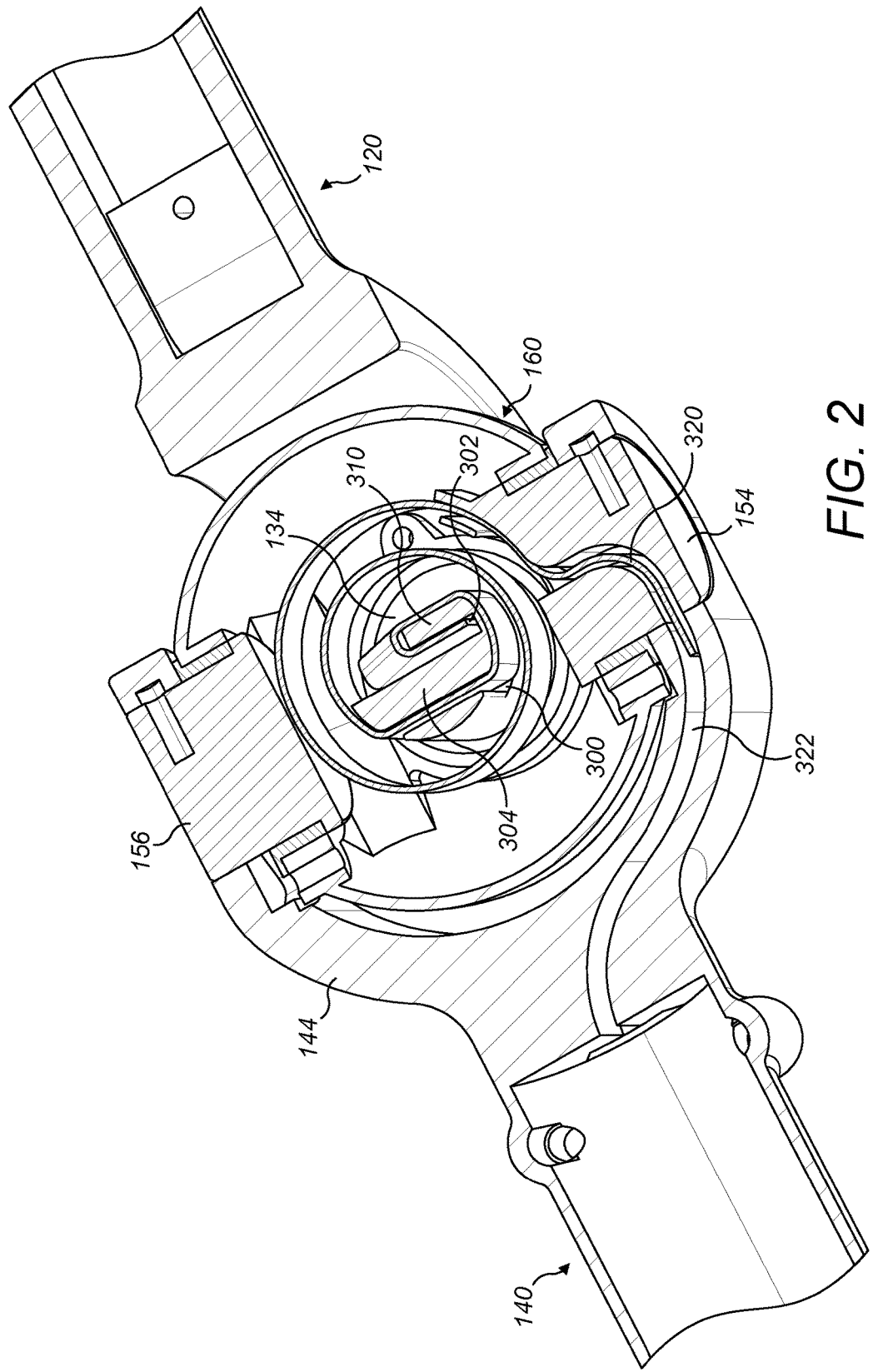
FIG. 2 is a schematic cutaway view of a mechanical link of FIG. 1, showing an interior of the interconnection member and an interior of each of the first and second arms.

FIG. 2 is a schematic cutaway view of the link 100 shown in FIG. 1, showing an interior of the interconnection member 160, as well as an interior of each of the first and second arms 120, 140.

Figure 3:
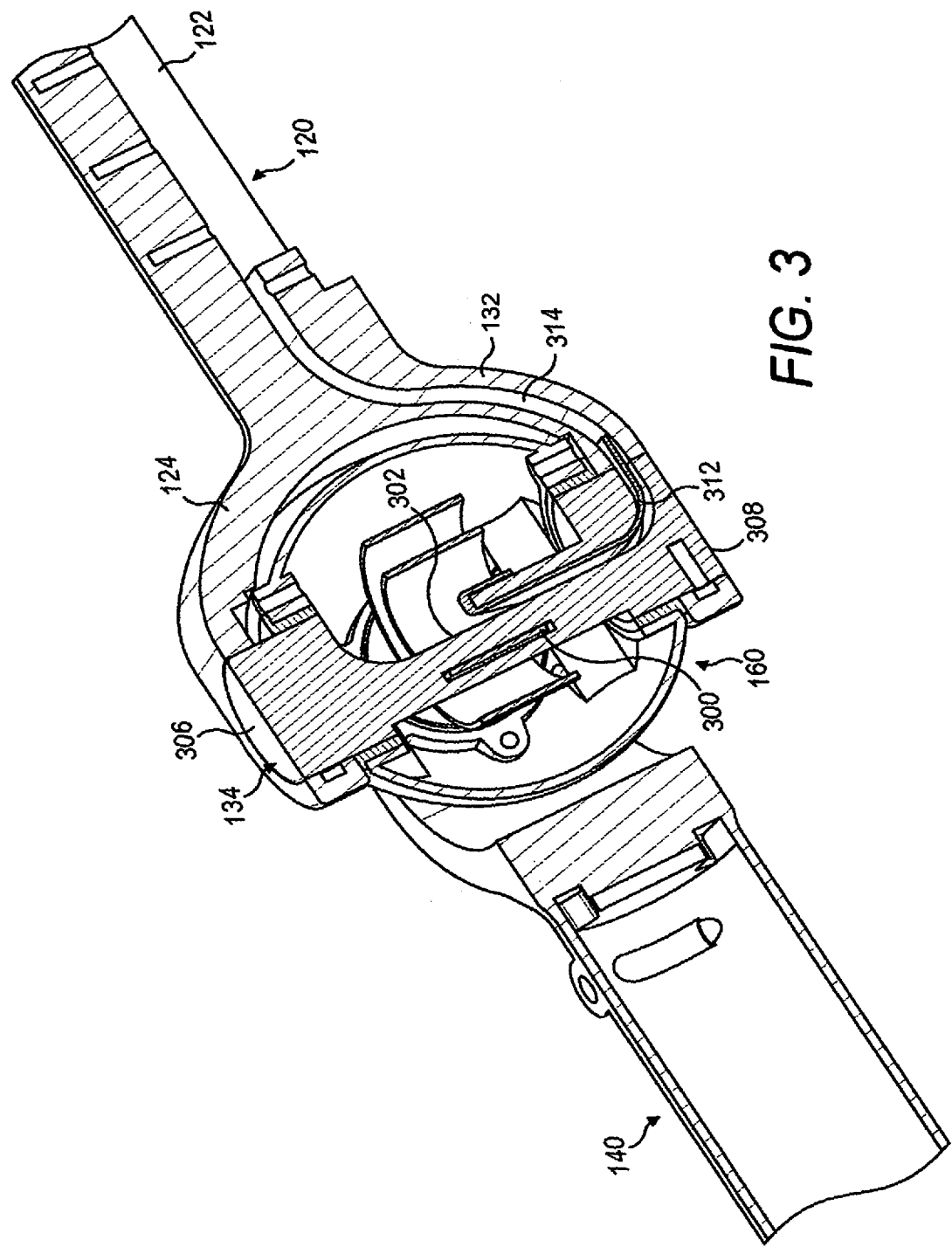
FIG. 3 is a further schematic cutaway view of the mechanical link illustrated in FIG. 1, showing the interior of the interconnection member and the interior of each of the first and second arms from a different angle from that of FIG. 2.

FIG. 3 is a further schematic cutaway view of the link 100 shown in FIG. 1, showing the interior of the interconnection member 160 and the interior of each of the first and second arms 120, 140 from a different angle from that of FIG. 2.

As can be seen from FIGS. 2 and 3, the through pin 134 is provided with first and second slots 300, 302 which, as shown in FIGS. 2 and 3, receive portions of a flexible conductor. As is most clearly shown in FIG. 3, the first slot 300 is formed as an aperture in a first portion 304 of the through pin 134, which first portion extends between first and second ends 306, 308 of the through pin 134. The second slot 302 is formed between the first portion 304 of the through pin 134 and a second portion 310 of the through pin 134, which second portion 310 extends from the first end 306 of the through pin 134 partway towards the second end 308 of the through pin 134.

As can be seen most clearly in FIG. 3, the second slot 302 terminates in an angled channel 312 which turns through an angle of approximately 90 degrees as it extends through an interior of the through pin 134. The angled channel 312 aligns with an elongate channel 314 that extends through the second side 132 of the yoke 124 of the first arm 120 and along the interior of the shaft 122 of the first arm 120. The purpose of the angled channel 312 and the elongate channel 314 is to receive and guide a flexible conductor, as will be explained in more detail below.

As can be seen most clearly in FIG. 2, the first post 154 is also provided with an angled channel 320 which turns through approximately 90 degrees as it extends through an interior of the first post 154. The angled channel 320 aligns with an elongate channel 322 that extends through the first side 250 of the yoke 244 of the second arm 140 and opens into the interior of the shaft 142 of the second arm 140.

Figure 4:
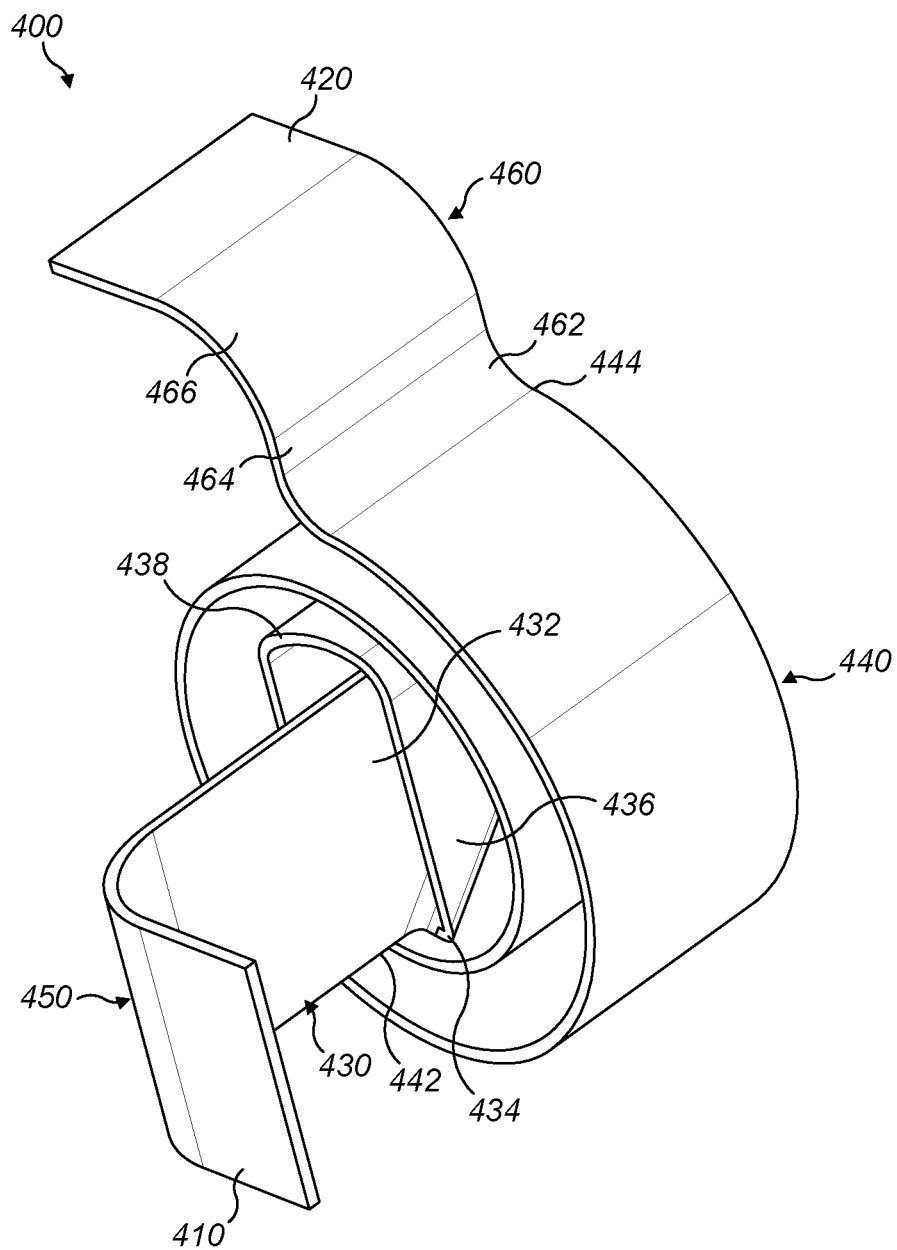
FIG. 4 is a schematic perspective view of a portion of a flexible conductor for use with the mechanical link illustrated in FIGS. 1 to 3.
Figure 5:
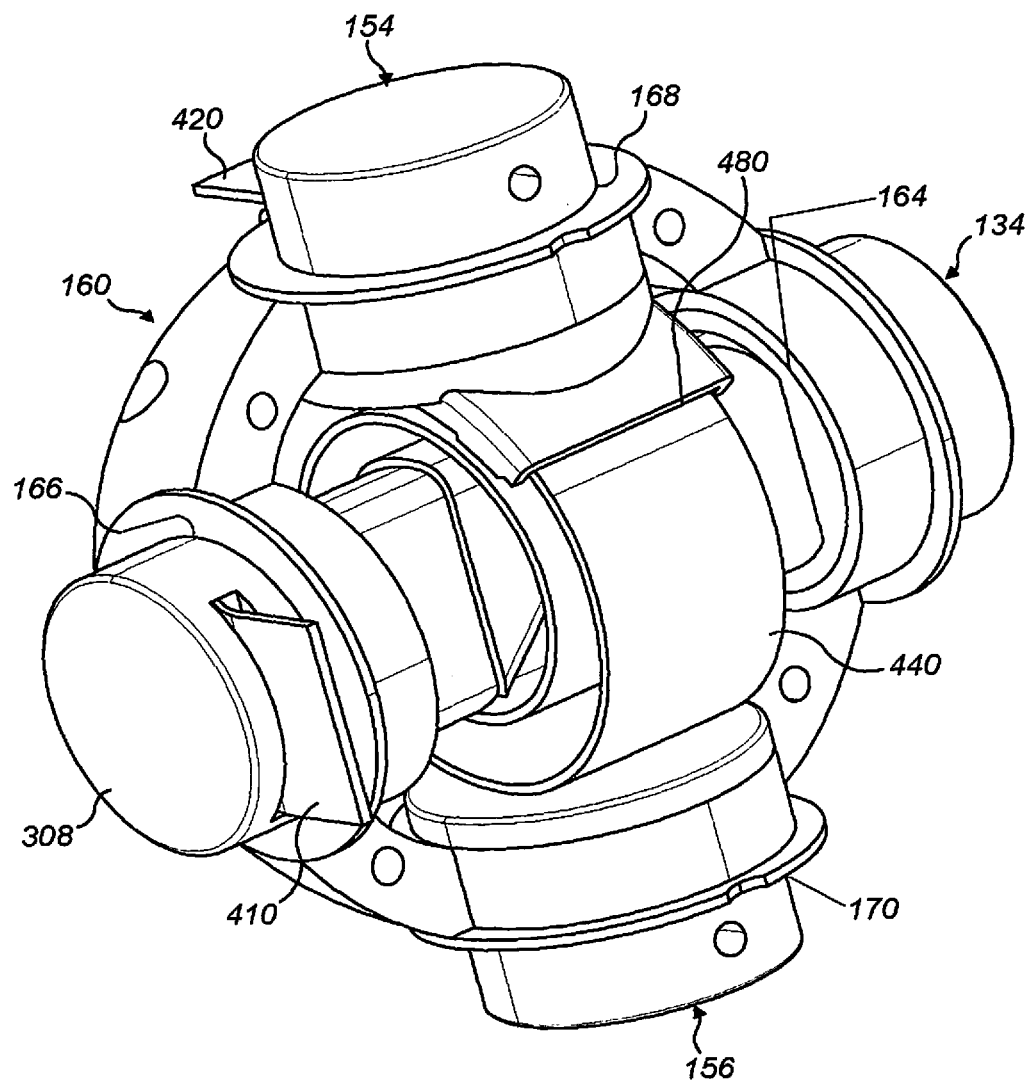
FIG. 5 is a cutaway view of the interconnection member of the mechanical link of FIGS. 1 to 3, with the flexible conductor of FIG. 4 installed.

FIG. 4 is a schematic perspective view of a portion of a flexible conductor for use with the mechanical link illustrated in FIG. 1, whilst FIG. 5 is a cutaway view showing the flexible conductor installed within the interconnection member 160.

The flexible conductor, shown generally at 400 in FIG. 4, is a generally flat, elongate conductor for carrying one or more electrical signals. The flexible conductor 400 may be, for example, a ribbon cable or flexible PCB.

The flexible conductor 400 is configured to be received within the mechanical link 100, and comprises a first elongate portion 410 (which, for clarity, is shown truncated in FIGS. 4 and 5), a second elongate portion 420 (which is again shown truncated in FIGS. 4 and 5), a central portion 430, a coiled portion 440, and first and second intermediate portions 450, 460. It is to be understood that, although the flexible conductor 400 is described here as a number of "portions" for ease of understanding, in practice the "portions" make up a single continuous conductor.

The first elongate portion 410 is a generally flat, straight portion of the conductor 400, which is linked to the central portion 430 by the first intermediate portion 450. The first intermediate portion 450 forms a bend in the conductor 400 of approximately 90 degrees, to allow the flexible conductor 400 to be received in and to follow the shape of the angled channel 312 in the second end portion 308 of the pin 234.

The central portion 430 is also a generally flat, straight portion of the conductor 400 which, when the mechanical link 100 is assembled, is received in the second slot 302 of the through pin 134, as shown in FIGS. 2 and 5. To this end, a distal end 432 of the central portion 430 includes a diagonally folded portion 434 which develops into an upstanding portion 436 that is parallel to the central portion 430, and whose edges are generally orthogonal to the edges of the central portion 430. The upstanding portion 436 terminates in a 180 degree bend 438, which in turn develops into a straight portion 439 which connects to an inner end 442 of the coiled portion 440.

As can be seen in FIGS. 2 and 5, when the conductor 400 is installed in the link 100, the central portion 430 is received between the first and second portions 304, 310 of the through pin 134. The diagonally folded portion 434 extends over a free end of the second portion 310 such that the upstanding portion 436 lies adjacent an outer edge of the second portion 310 of the through pin 134. The 180 degree bend 438 extends around free ends of the first and second portions 304, 310 of the through pin 134, and the straight portion 439 is received in the first slot 300, between the first and second portions 304, 310 of the through pin 134.

The coiled portion 440 enables the flexible conductor 400 to accommodate movement of the arms 120, 140 about their respective axes of rotation. To this end, when the central portion 430 is received in the second slot 302 of the through pin 134, the coiled portion 440 forms a loose coil arrangement around the first and second portions 304, 310 of the through pin 134 comprising, in the illustrated example, approximately one and a half coil turns, with the coil turns being spaced apart and substantially parallel to each other. It will be appreciated that more or fewer coil turns may be provided, as required by the particular application of the link 100.

This loose coil arrangement can be coiled or uncoiled as required to accommodate rotation of the first arm 120 in the directions indicated by the arrow 135 in FIG. 1. Thus, when the first arm 120 rotates, the coiled portion 440 coils or uncoils depending upon the direction of rotation, in order to accommodate the rotation.

The loose coil arrangement also permits the flexible conductor 400 to twist about a central longitudinal axis of the flexible conductor 400 in order to accommodate rotation of the second arm 140 in the directions indicated by the arrow 155 in FIG. 1. Thus, when the second arm 140 rotates, the coiled portion 440 of the flexible conductor 400 twists about the central longitudinal axis of the flexible conductor 400, such that the spacing between the coil turns of the coiled portion 440 is reduced. At the extremes of the rotational movement of the first arm 120 the coil turns of the coiled portion may come into contact with one another as a result of the twisting of the coiled portion 440 of the conductor 400

The use of a single coiled portion 440 in the single continuous flexible conductor 400 to accommodate rotation about two orthogonal axes simplifies the design and construction of the link 100, and reduces the risk of failure of the conductor 400, since the single continuous flexible conductor 400 includes no joints or connections that could fail under stress.

The second elongate portion 420 is a generally flat, straight portion of the conductor, which is linked to an outer end 444 of the coiled portion by the second intermediate portion 460. The second intermediate portion 460 includes a pair of opposed bends 462, 464 in the conductor 400, which are linked by a central straight portion 466 of the second intermediate portion 460. The bends 462, 464 and the straight portion permit the conductor 400 to be received in and to follow the shape of the angled channel 320 in the first post 154.

As shown in FIG. 5, when the flexible conductor 400 is installed in the mechanical link 100, the first elongate portion 410 extends out of the angled channel 312 in the second end portion 308 of the pin 234, and is received in the channel 314 that extends through the interior of the second side 132 of the yoke 124 of the first arm 120 and along the interior of the shaft 122 of the first arm 120.

Similarly, when the flexible conductor 400 is installed in the mechanical link 100, the second elongate portion 420 extends out of the angled channel 320 of the post 154, and is received in the channel 322 that extends through the interior of the first side 150 of the yoke 144 of the second arm 140.

As discussed above, when the flexible conductor 400 is installed in the mechanical link 100, the central portion 430 of the flexible conductor 400 is received in the second slot 302 and the straight portion 439 is received in the first slot 300 of the through pin 134, the coiled portion 440 coils loosely around the through pin 134. The positioning of the central portion 430 and the straight portion 439 within the second and first slots 302, 300 respectively anchors the conductor 400 within the slots, thus ensuring that the coiled portion 440 coils and uncoils when the first arm 120 moves, rather than moving freely within the housing 162, and ensuring that the coiled portion 440 twists when the second arm 140 moves, rather than moving or extending along the through pin 134.

The first intermediate portion 450 of the conductor 400 is received in the angled channel 312, whilst the second intermediate portion 460 is received in the angled channel 320. The positioning of the intermediate portions 450, 460 within the angled channels 312, 320 helps to retain the coiled portion 440 of the conductor 400 in position within the housing 160, restricting movement of the conductor 400 during movement of the second arm 140, thereby ensuring that the coil turns of the coiled portion 440 twist to accommodate the movement of the second arm 140. To secure and stabilize the coiled portion 440 further, thereby ensuring correct twisting of the coiled portion 440, the outer end 444 of the coiled portion 440 may be received in a guide or slot 480 that is connected to or integral with the post 154.

As indicated above, although in the examples described and illustrated herein the mechanical link 100 guides and protects a flexible conductor, it will be appreciated by those skilled in the art that the principles described can be applied to other types of flexible members, including, for example, cables, pneumatic and hydraulic hoses, fiber optic cables and the like, even where those flexible members are not flat. The only requirement is that there is sufficient space within the interconnection member to accommodate a coiled portion of the flexible member.

The invention claimed is:

1. A mechanical link, the mechanical link comprising a first arm, a second arm, an interconnection member, and a flexible member, wherein:
   the first arm is rotatable about a first axis of the interconnection member;
   the second arm is rotatable about a second axis of the interconnection member, the second axis being orthogonal to the first axis; and wherein:
   the flexible member extends along the first and second arms and is adapted to accommodate rotation of the arms about the first and second axes, the flexible member having a single coiled portion which is received within the interconnection member such that the coiled portion can coil and uncoil to accommodate rotation of the first arm, wherein the coiled portion is further configured to twist about an axis of the flexible member to accommodate rotation of the second arm.

2. The mechanical link according to claim 1 wherein the first arm engages with a through pin that extends through the interconnection member along the first axis of the interconnection member to permit rotation of the first arm about the first axis.

3. The mechanical link according to claim 1 wherein the second arm engages with first and second posts that are received in the interconnection member along the second axis of the interconnection member to permit rotation of the second arm about the second axis.

4. The mechanical link according to claim 1, wherein the first and second arms each comprise a channel for receiving the flexible member.

5. The mechanical link according to claim 4, wherein the first arm engages with a through pin that extends through the interconnection member along the first axis of the interconnection member to permit rotation of the first arm about the first axis, the through pin is provided with a channel for receiving the flexible member and guiding the flexible member towards the first arm and the channel of the first arm is aligned with the channel of the through pin.

6. The mechanical link according to claim 1 wherein the mechanical link is configured as a universal joint.

7. The mechanical link according to claim 1 wherein the flexible member is a generally flat, elongate flexible electrical conductor.

8. The mechanical link according to claim 7 wherein the flexible electrical conductor is a single continuous conductor.

9. The mechanical link according to claim 1 wherein the flexible member comprises a cable or hose.

10. A mechanical link, the mechanical link comprising a first arm, a second arm, an interconnection member, and a flexible member, wherein:
    the first arm is rotatable about a first axis of the interconnection member;
    the second arm is rotatable about a second axis of the interconnection member, the second axis being orthogonal to the first axis
    the first arm engages with a through pin that extends through the interconnection member along the first axis of the interconnection member to permit rotation of the first arm about the first axis and the through pin is provided with a slot for receiving a portion of the flexible member; and
    the flexible member extends along the first and second arms and is adapted to accommodate rotation of the arms about the first and second axes, the flexible member having a single coiled portion which is received within the interconnection member such that the coiled portion can coil and uncoil to accommodate rotation of the first arm, wherein the coiled portion is further configured to twist about an axis of the flexible member to accommodate rotation of the second arm.

11. The mechanical link according to claim 10 wherein the slot extends through a full diameter of the through pin.

12. The mechanical link according to claim 10 wherein the through pin comprises a solid end portion and the slot begins partway along the through pin from the solid end portion.

13. The mechanical link according to claim 10 wherein the through pin further comprises a further slot for receiving a further portion of the flexible member.

14. The mechanical link according to claim 10 wherein the through pin is provided with a channel for receiving the flexible member and guiding the flexible member towards the first arm.

15. The mechanical link according to claim 14 wherein the channel is angled.

16. A mechanical link, the mechanical link comprising a first arm, a second arm, an interconnection member, and a flexible member, wherein:
    the first arm is rotatable about a first axis of the interconnection member;
    the second arm is rotatable about a second axis of the interconnection member, the second axis being orthogonal to the first axis
    the second arm engages with first and second posts that are received in the interconnection member along the second axis of the interconnection member to permit rotation of the second arm about the second axis;
    the first post is provided with a channel for receiving the flexible member and guiding the flexible member towards the second arm; and
    the flexible member extends along the first and second arms and is adapted to accommodate rotation of the arms about the first and second axes, the flexible member having a single coiled portion which is received within the interconnection member such that the coiled portion can coil and uncoil to accommodate rotation of the first arm, wherein the coiled portion is further configured to twist about an axis of the flexible member to accommodate rotation of the second arm.

17. The mechanical link according to claim 16 wherein the channel is angled.

18. The mechanical link according to claim 16, wherein the channel of the second arm is aligned with the channel of the first post.

* * * * *